United States Patent [19]

Gutris

[11] 4,186,479
[45] Feb. 5, 1980

[54] PROCESS FOR MANUFACTURING ROTORS FOR IN-OUT ELECTRIC MOTORS

[76] Inventor: Giorgio Gutris, 231.6.2 Avenidà de 27 de Enero, Premia de Mar, Spain

[21] Appl. No.: 804,754

[22] Filed: Jun. 8, 1977

[30] Foreign Application Priority Data

Jun. 16, 1976 [IT] Italy ............................... 24353 A/76

[51] Int. Cl.² .......................................... H02K 15/02
[52] U.S. Cl. .................... 29/598; 164/108; 164/112; 310/42; 310/67 R
[58] Field of Search ................ 29/598; 310/42, 67 R; 164/108, 112; 249/91, 96, 97

[56] References Cited

U.S. PATENT DOCUMENTS 3,777,191  12/1973  Papst et al. ...................... 310/67 R Primary Examiner—Carl E. Hall
Attorney, Agent, or Firm—Wenderoth, Lind & Ponack

[57] ABSTRACT

A rotor for in-out electric motor having a shaft coaxial with its stator, ferromagnetic portions external to the stator and a cup-like shield which rigidly connects one end head of the ferromagnetic portions to one transversally extended head of the shaft, the head being at least peripherically incorporated in and made rigid with a cast metal component forming a part of the shield and which is rigid with the ferromagnetic portion. A process for producing the resulting rigid assembly is provided wherein the coaxiality of the shaft and portions is ensured. Also there is shown a mould for casting the cast metal component.

7 Claims, 15 Drawing Figures

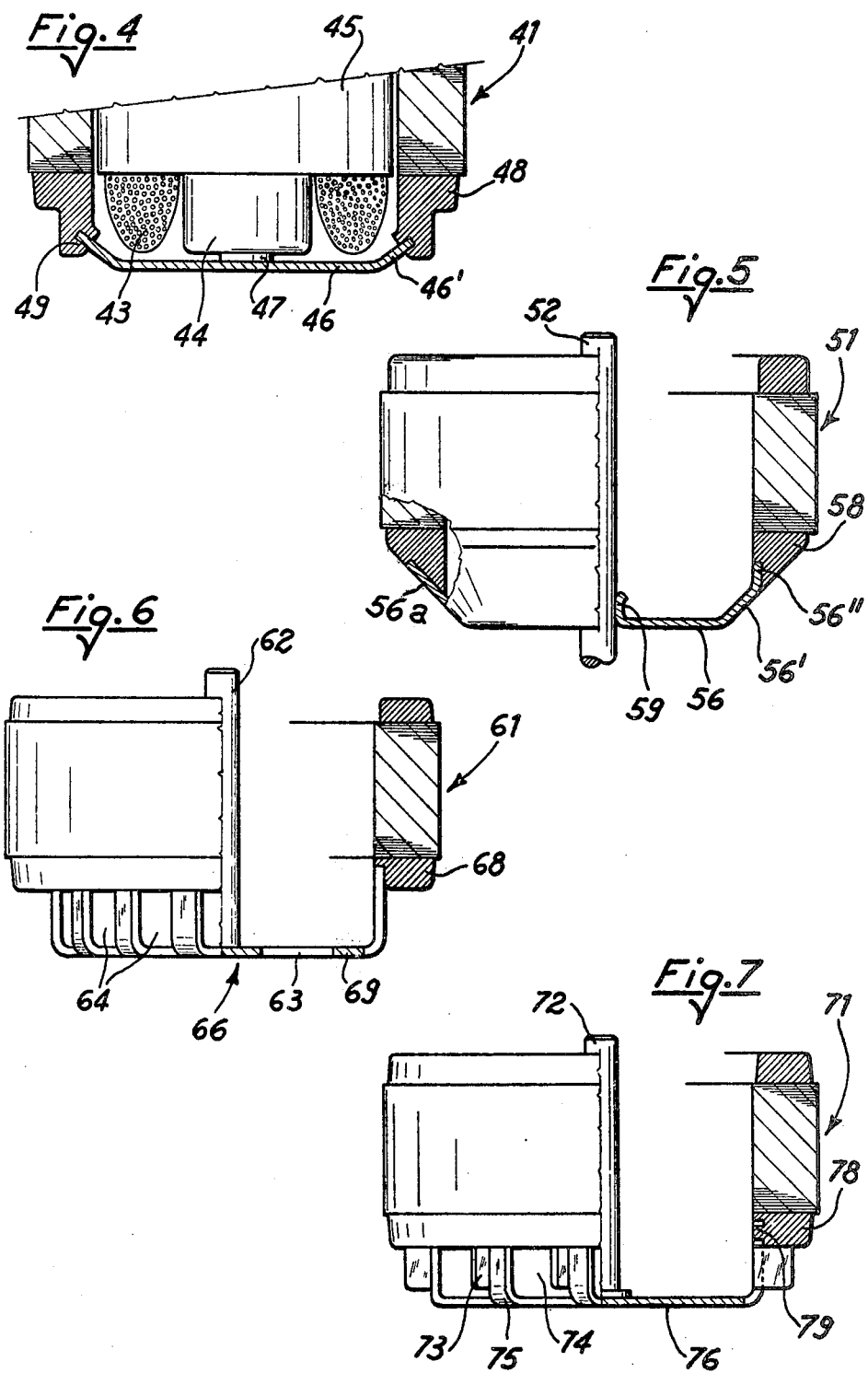

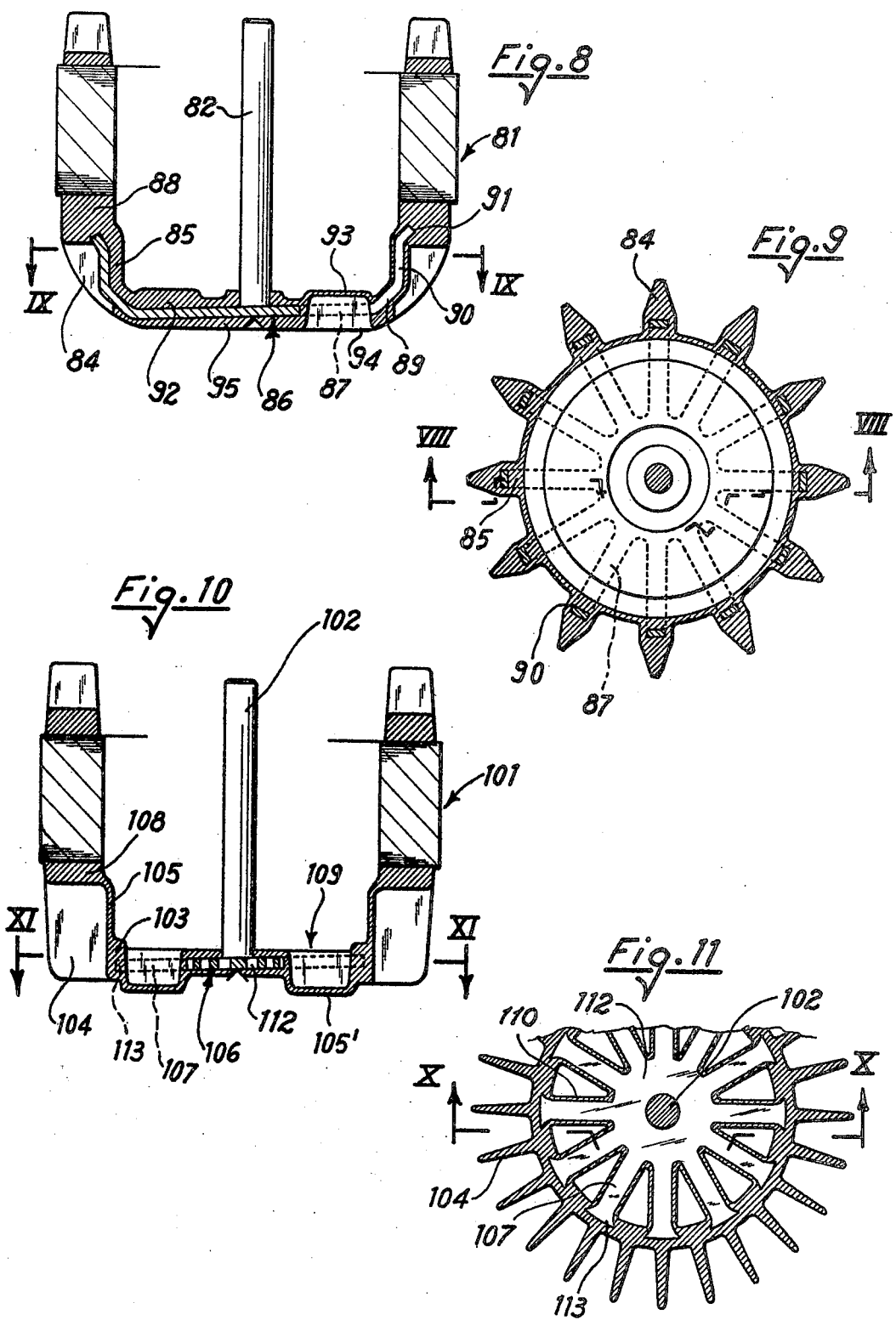

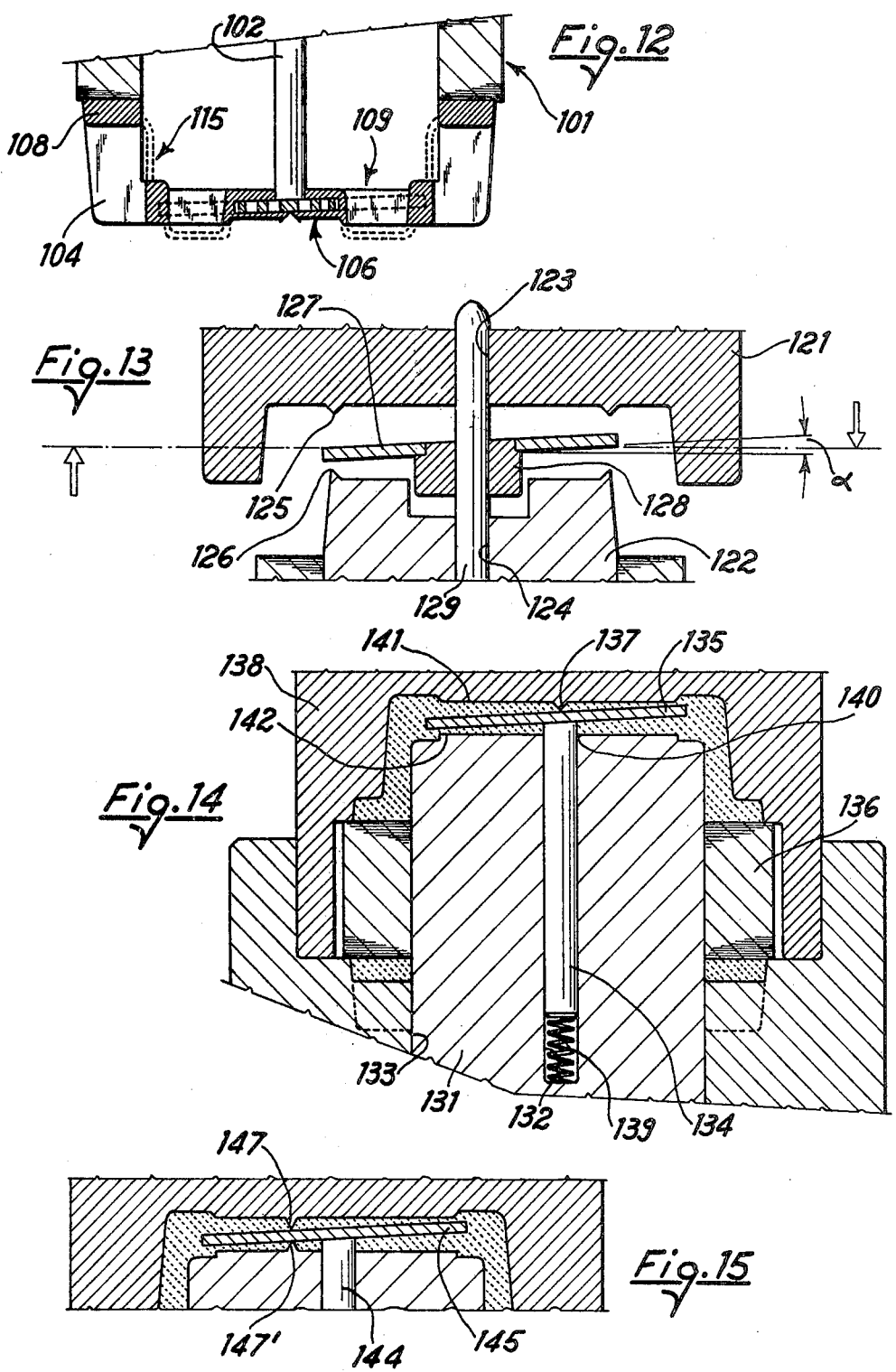

PROCESS FOR MANUFACTURING ROTORS FOR IN-OUT ELECTRIC MOTORS

BACKGROUND OF THE INVENTION

The present invention refers to rotors for in-out electric motors and to a process for their manufacture.

In-out electric motors, that is, motors built with the stator on the inside and the rotor on the outside, are known. In such motors the rotor rotates centered about the stator because it is rigidly connected to a shaft which in turn rotates in one or more supports centered with respect to the geometric shape of the stator and contained in the central part of the stator itself or in an apposite tube or housing rigidly connected therewith.

The coaxial relationship of the shaft with respect to the outside of the stator is better, the greater the axial extension of the bearing of the shaft, or the number of the shaft bearings if there are a plurality of them and provided that they are positioned at a considerable mutual distance. This is advantageous from other viewpoints, in that it permits the use of simple bearings, reduces the forces acting thereon, improves lubrication, and so on. From the electrical view point, especially in small, and particularly in two-pole in-out motors, it is desirable that the bore of the stator through which the shaft passes be as small as possible because the entire core of the stator is an active portion of ferromagnetic material. To obtain this, the bearings, which occupy a considerable radial space, have to be shifted axially to the outside of the stator.

These and other structural exigencies of in-out electric motors are not adequately met in the art, and the rotor structures as well as the processes for making the same are not satisfactory.

In the known motors the rotor is provided at one of its ends with a hub which is connected to the shaft which rotates centered with respect to the geometric shape of the stator. This is obtained, in known processes, by casting together with a short-circuit ring of the rotor a cup-like shield which extends until it connects with a hub and which actually is usually cast as solid therewith. Since the material most adapted for making short-circuit rings is pure aluminium, which however has a low elastic limit and a low elastic modulus and is easily deformable, both the shield and hub have to made rather thick. Thus the hub itself acquires considerable axial and radial dimensions which subtract space from the bearing and force it to be located more internally with respect to the motor, thus decreasing the distance from the other bearing and occupying a volume which would be much more advantageously occupied by ferromagnetic material. The shield, with its considerable thickness, increases the axial dimension of the motor proper at the zone where this dimension is given by the axial dimension of the windings plus the thickness of the shield, which is in contrast with the requirement, highly desired in this type of motor, of containing the axial dimension within the narrowest possible limits. The use of materials mechanically more resistant than pure aluminium, such as for instance aluminium-silicium alloys, has not solved the problem because the greater electric resistance of such materials makes it necessary to employ greater cross-sections for the rotor cavities, thus requiring a greater amount of cast material, and increases the dimensions of the motor because the ferromagnetic material substracted by the enlargment of the cavities has to be integrated in some way.

Further, when apertures for the inlet of air which ventilates the inside of the motor have to be provided in the shield near the hub, the thickness of the shield must be further increased to compensate for the loss of rigidity due to such apertures, thus further increasing the axial dimension of the motor.

In another known construction, the hub connected to the shaft is in turn connected to a rigid metal disc provided with radial projections which are incorporated as inserts in the cast of the adjacent short-circuit ring. This structure too, however, is not satisfactory because it does not fully satisfy the aforementioned structural conditions, and in particular, the space taken up by the hub, which still exists, does not permit the maximum spacing of the bearings of the rotor shaft associated with the maximum containment of the axial dimensions of the motor. Further, the known processes for making the rotor do not provide a perfect centering of the shaft with respect to the inner rotor surface without additional finishing operations, which are operatively and economically burdensome.

SUMMARY OF THE INVENTION

It is an object of the present invention to provide a structure of a rotor for in-out motors which makes it possible to obtain the maximum spacing between the bearings of the rotor shaft and/or the maximum space for the windings, concurrently with the reduction of the axial dimension of the motor.

Another object of the present invention is a process for the manufacture of rotors for in-out electric motors, which makes it possible to obtain the perfect centering of the shaft with respect to the inside of the rotor through a minimum of operations and in the simplest, most economical and safest manner.

Both the structure and the process of the invention make it possible to obtain in an easy and economical manner a good ventilation of the motor, and permit the construction of only one rotor for use both in an open ventilated motor and in a closed motor, the passage from the one to the other type being obtained by a simple and economical operation.

Essentially, according to the invention, the rotor, rotatively supported by a shaft mounted in the fixed structure associated to the inner stator, is supported and rigidly connected to the shaft itself, in correspondence with an essentially cup-shaped shield associated with the ferromagnetic components of the rotor, through an essentially flat head, the axial thickness of which need not exceed the diameter of the shaft itself, which head is rigidly connected to one end of the shaft, and incorporated at least in the peripheral portion thereof in a cast body forming at least in part the shield.

According to an important characteristic of the process according to the invention, the rigid connection of the shaft to the shield is effected by firstly positioning in perfect coaxial relationship the shaft and the inner surface of the ferromagnetic rotor components, independently of the positioned relationship of the shaft and the essentially flat head, and subsequently forming the shield by casting, to thereby connect the ferromagnetic components to the head and therefore to the shaft connected thereto, without generating elastic deformations in the head or in the shaft itself.

According to a preferred but not exclusive embodiment of the invention, the shaft is rigidly connected to the head by welding, resulting in connecting the welded components in conditions of approximate orthogonality, such approximation being absorbed and compensated by the position assumed by the head within the cast shield connecting the head to the ferromagnetic components of the rotor, predisposed and maintained, until the casting has completely hardened, in conditions of perfect coaxiality with the shaft.

BRIEF DESCRIPTION OF THE DRAWINGS

Other characteristic advantages of the invention will be understood from the following description of preferred embodiments, with reference to the attached drawings, wherein:

FIGS. 3 and 4 illustrate in diametral cross-section the end connected to the shaft, of two rotors according to the invention, adjacent parts of the stator being shown in elevation;

FIG. 5 illustrates, half in elevation and half in cross-section, a rotor according to another embodiment of the invention, a further variant being indicated in partial cross-section in the left hand portion of the figure;

FIGS. 6 and 7 illustrate, half in cross-section in a radial plane and half in elevation, other rotors according to other embodiments of the invention;

FIG. 8 illustrates another embodiment of the invention, in cross-section along the plane VIII—VIII of FIG. 9; FIG. 9 is a cross-section along the plane IX—IX of FIG. 8;

FIG. 10 illustrates a rotor according to another embodiment of the invention, in cross-section along the plane indicated by X—X in FIG. 11;

FIG. 11 is a cross-section approximately along the transversal plane indicated by XI—XI in FIG. 10;

FIG. 12 illustrates, limited to its portion adjacent to the end connected to the shaft, the rotor of FIGS. 10 and 11, but modified for a different use by removal of two of its parts;

FIG. 13 represents, in diametral cross-section and somewhat schematically, a known method for making rotors of in-out motors, for the purpose of comparison with the improved process according to the invention;

FIG. 14 represents, with some deliberate alterations in the relative positions of the parts, a first embodiment of the method according to the invention, to illustrate its main characteristics and possibilities; and FIG. 15 represents in like way and fragmentarily, a variant of such method.

DETAILED DESCRIPTION OF THE INVENTION

Figure 1:
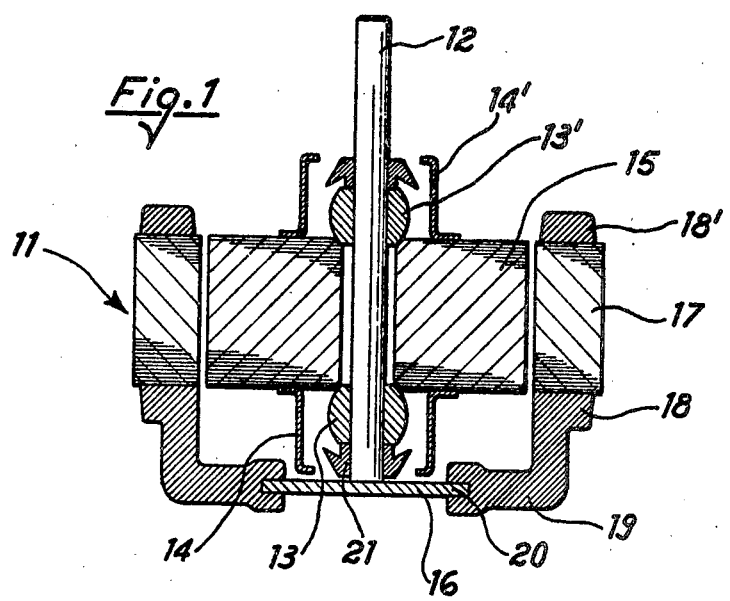
FIG. 1 illustrates in axial cross-section a motor according to an embodiment of the invention.

FIG. 1 shows an in-out motor, illustrated for the sake of simplicity without the support connecting it to the utilization apparatus and without a winding. The rotor is generally indicated at 11, and is here shown for simplicity's sake as of the closed type, the rotor extending on the outside of the motor except for the shaft 12 which rotates within bearings 13—13' contained in housings 14—14' rigidly connected with the stator 15. Means, here not shown, maintain the spherical bushings or bearings carrying the rotor in registration in their seats provided in the ferromagnetic material or at any rate in the stator structure.

The shaft 12 has, at one of its ends a disc-like piece 16 having, as is seen, a thickness smaller than the diameter of the shaft itself, whereby the whole assumes the shape of a nail having a flat head in which the shaft 12 constitutes the stem and the discoid 16 of the head.

The ferromagnetic part of the rotor 11 and the short-circuit rings 18—18' are rigidly connected to the head 16 of the shaft by means of cup-like shield 19 which is in general cast concurrently with the rings, and which embraces the periphery 20 of the shaft head 16 and is rigidly connected therewith, optionally also by means of undercut portions, not shown, formed in the periphery of the head 16.

The shield 19 and the periphery 20 of head 16 are joined along a curved line the diameter of which is many times greater than the diameter of the shaft 12 and which embraces the part 20 of head 16 on three sides. According to the invention, the part of the head 16 of the shaft not enclosed in the casting 19, radially extends to a diameter slightly greater than that of the housing 14 which extends axially to a position adjacent to the inner face of the head 16. If it is necessary to form, by casting below the shaft head or in another position, an element for the recovering of the oil (not shown) similar to the element illustrated at 21 as fitted on the shaft 12, such element may be formed from the same material and in the same casting operation which creates the shield 19. In fact, a film of casting material, not illustrated in the drawing because its thickness is minimal and it is generally incomplete, is always present on the inner and outer faces of the head 16 (as will be better understood from the description of the process according to the invention), which film derives from the particular casting system without residual tensions employed according to the invention and to be described hereinafter.

The thickness of the head 16 and of the shaft 12 obviously depend on the elastic limit and on the elastic modulus of the material employed, as well as on the process employed for rigidly connecting the head itself to the shaft when they are not built as one piece.

Figure 2:
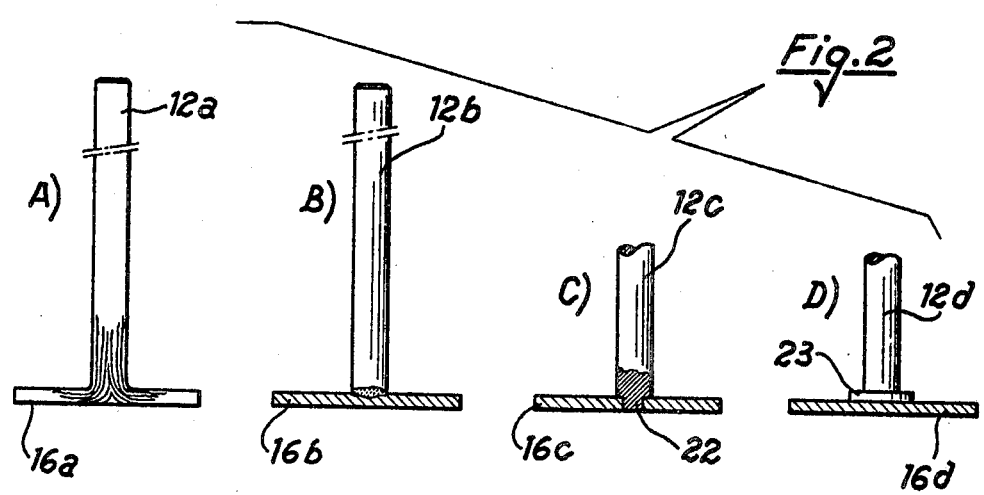
FIGS. 2 (A, B, C and D) illustrate, partly in elevation and partly in cross-section, some variants of a detail of FIG. 1.

In FIG. 2 some variants of shafts and respective heads according to the invention are shown. The four variants of the figures are identified with the letters (A), (B), (C), (D). The shafts and the discoids are indicated by the numerals 12 and 16 and the corresponding identifying letter. In the first variant the discoid 16a is formed from the material of the shaft 12a itself by pressing or forging. The shaft 12b on the contrary is rigidly connected with the discoid 16b by a head weld effected in any suitable way. The shaft 12c is solidly connected with the discoid 16c by brazing with the use of a reference portion 22 to facilitate the centering and/or the welding of the two pieces. The shaft 12d, on the contrary, is provided with an enlargement 23 to increase the surface through which it is connected to the head 16d.

Obviously other variants may be devised without exceeding the scope of the invention, such as for instance that shown in FIG. 5.

Figure 3:
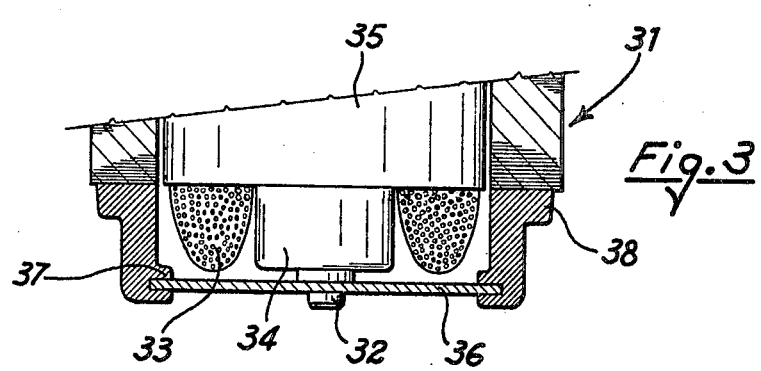

In FIG. 3 another embodiment of the invention is illustrated. The rotor is generally indicated at 31, the stator at 35, the single short circuit ring is illustrated at 38, the shaft at 32. Numeral 34 indicates a housing of the forward bearing of the shaft, rigidly connected with the stator, corresponding to the housing 14 of FIG. 1. The head 36 of the shaft 32 is discoidal, like the head 16 of FIG. 1, but is diametrally extended to the zone which faces the windings 33 of the motor shaft. This embodiment of the invention, besides leaving the space for the bearing housing 34, permits the windings to extend to a safe distance from the head 36, whereby the thickness of the part 37 of the casting located about the head and which envelops it, is gained.

The axial space taken up by the motor may be further reduced in the embodiment of FIG. 4, similar to FIG. 3 and wherein the numerals 41, 43, 44, 45, 48 respectively correspond to the numerals 31, 33, 34, 35, 38, of FIG. 3. Numeral 47 indicates an oil recovery or a spacing element. Numeral 46 indicates a discoid connected to the shaft to form a head which has a form modified with respect to that of FIG. 3. The outer surface of discoid 46 axially limits the rotor structure of the motor. The discoid 46 is stamped or bent in any way as indicated at 46' and it is the stamped portion which is incorporated into the casting 49 and unites it to the short-circuit ring 48, and may be considered as a shield reduced to an axial ring, so that casting 49 is contained within the axial dimension defined by the discoid 46.

In FIG. 5 a rotor according to another embodiment of the invention is illustrated, in elevation in the left hand part of the figure and in cross-section in the right hand part of the same, a variant being illustrated in the fragmentary left hand cross-section. The rotor is generally designated by numeral 51. 52 is the shaft thereof. The discoid 56 is deepstamped in the zone indicated by 56' to assume a cup-like shape and forms a rim in the peripheral zone indicated by 56". Preferably the rim 56" will carry undercut portions, not illustrated for the sake of simplicity, better to become anchored in the casting of the short-circuit ring 58. The aforesaid discoid is of a material having a high elastic modulus and limit and is therefore thin with respect to the cast portions, has a smaller diameter than all the previously illustrated variants, and presents a smaller front surface, to currents of air flowing against it, thereby taking up less space and creating less of an obstacle to any such current. It is noted that in the embodiment herein illustrated the shaft passes through discoid 56, and therefore the discoid 56 must be stamped also in its central zone to form an axially bent portion 59 which facilitates its connection to the shaft.

The rim 56" may be omitted, and the head 56 may merely have a peripheral zone stamped in frusto-conical shape, as illustrated at 56a.

In the embodiment illustrated in FIG. 6, essentially analogous to that of FIG. 5, the rotor is designated by 61, the shaft by 62, and 68 designates a short-circuit ring corresponding to ring 58 of FIG. 5. The discoid 66 is herein completely bent into a cup-like shape and is provided with a series of front openings 63 and side openings 64, these latter permitting the heated air to flow out of the motor. Between the openings 63 and the openings 64 there is preferably defined a reinforcing ring 69, which may be eliminated such that the openings 64 may be simply prolongations of the openings 63.

FIG. 7 illustrates a variant of FIG. 6.

The numerals 71, 72, 76 and 78 respectively correspond to the numerals 61, 62, 66 and 68 of FIG. 6.

The central part of the discoid is here shown by way of example as free from openings, whereas the peripheral part has openings 74 corresponding to the openings 64 of FIG. 6. The portions 73 of the discoid between the openings 74 are bent to form wings, thus centrifugally moving the air which is drawn into the motor and stiffening the portions 75 which constitute, as it were, spokes of the shaft head. The portions 75 preferably have undercut portions, in the example illustrated, bores 79, which by becoming filled of casting material, perfectly connect the head of the shaft to the short-circuit ring 78.

In FIGS. 8 and 9 another preferred embodiment of a rotor according to the present invention is illustrated. The rotor is generally indicated at 81 and the shaft at 82. The shaft head, indicated at 86, is shaped on its periphery so as to forms spokes 87 (see FIG. 9) which bend in the portion 89 in funnel-like manner so as to reduce the front cross-section, and bend then further in cup-like configuration in the portion 90, and finally have a terminal portion 91 anchored in the casting of the short-circuit ring 88, which portion 91 may be indented in any way not illustrated, better to become anchored within the ring.

It should be noted that the head 86 is here assumed to be deformed either because the welding to the shaft 82 has not been executed in perfect perpendicular relationship or because of punching and stamping defects or defects of any other method of forming the discoid. It is therefore rotated by a small angle in the counter-clockwise direction, as seen in FIG. 8, with respect to its ideal position in perfect perpendicular relationship with shaft 82. The casting, whereby the short-circuit ring 88 and the other cast parts have been generated, also produces, in the embodiment illustrated, the wings 84 which serve to cool the rotor and the shield, only on the outside, since the openings for the outlet of the air from the motor are closed by a layer 85 of aluminium or other material employed for the casting. The spokes 87 of the discoid 86 are also covered on their faces with casting material 92, which further extends between the one and the other spoke on the bottom of the recesses 94, with a layer 93 of material, which constitutes the bottom of recesses 94, which open outwardly and only serve to cool the bowl.

In FIG. 10 there is illustrated a rotor according to another embodiment, analogous to that of FIGS. 8 and 9, which is differentiated therefrom in that the spokes 107 of discoid 106 connected to shaft 102 of rotor 101, extend only slightly beyond the end of the zone which faces the windings—here not illustrated—of the stator.

Numeral 104 designates cooling fins corresponding to fins 84 of FIG. 8, which also have the function of rigidly connecting the short-circuit ring 108 with the stiffening ring 103 which is here made by casting.

A film 105 closes the rotor at the base of the fins, while another film 105' closes it in correspondence to the openings 109 which however always serve to stir the air within the motor.

FIG. 11 shows in detail the embodiment of FIG. 10, specifically the discoid 106, which includes a central circular portion 112 and spokes 107 which terminate with expansions 113 which are inserted in the casting. In the case of FIG. 10 they are inserted in a ring 103, but they could be inserted in cast parts having different shapes, such as fins or the like. A thin layer of casting material 110 envelops, also laterally, all the spokes.

FIG. 12 illustrates the same rotor of FIG. 10 which has been modified merely by removing the film 105 (which is indicated in broken lines in FIG. 12) and opening the air passages 115, while by removing the film 105' (it too indicated in broken lines) the air passages 109 are opened and the rotor becomes an open one. The parts which are not changed in FIG. 12 with respect to FIG. 10 are indicated by the same numerals.

Various embodiments of a rotor according to the present invention have been described.

The invention, as stated hereinbefore, also has as an object a process for the manufacture of a rotor for an in-out motor, and such a process enables the manufacture of all the rotors described and other analogous, as well as rotors of a different structure, as will be better understood from the following description.

For a better understanding of the process, a mould of a known type for the manufacture of rotors of in-out motors, such as illustrated for example in FIG. 8 of U.S. Pat. No. 3,777,191 has been shown in FIG. 13. This mould is fundamentally constituted by two parts, 121 and 122. Both possess central bores, respectively 123 and 124, for the passage of the shaft of the rotor or of a false shaft and possess usually circular projections, respectively 125 and 126, facing each other.

Assuming that it is wished to make a rotor in which there is a discoid 127 connected by a hub 128 to a shaft 129, the peripheral zone of the discoid will be clamped, when the mould is closed, between the cited projections 125 and 126. If the plane of the disc is perfectly perpendicular to the axis of the shaft, the operation occurs without difficulty. But to achieve in practical cases such a perfect perpendicular relationship is almost impossible is and when possible, difficult and expensive. A perfect registration of the shaft could be obtained by rectifying the hub after the casting, but this involves an additional costly operation.

If a casting has to be effected in the presence of a shaft connected to a discoid which is not perfectly perpendicular to the shaft, as is practically inevitable and as shown in FIG. 13, that is, a shaft which is set at a small but significant slant to the axis of the discoid, the projections 125–126, clamping the disc, will cause the assembly formed by disc, hub and shaft, to rotate to annull the angular deviation of the disc, and will therefore cause the shaft to become disposed at an angle equal to the angle α, in FIG. 13, with respect to the axis of the mould, and therefore of the rotor which will be formed by casting therein.

If the rotation of the whole is not permitted, as occurs for instance if the bore 124 is made with a negligible play in such a way that no reactions may be discharged in it, such reactions have a moment which tends to cause mutual rotation of the shaft and disc, and therefore create elastic deformations in the assembly. As soon as the cast rotor, with the disc and the shaft (or the bore for the shaft, if a false shaft is been used during casting) is removed from the tool, the hyperstatic reactions determined by the bore 124 cease to exist and the shaft or the bore for the shaft elastically assumes a position slanted by the angle α with respect to the axis of the motor. All this substantially prevents casting the rotor with the shaft already mounted on the disc, because the bore of the hub must be re-reamed with reference to the rotor axis; or if the disc is cast with the shaft it will then be necessary to ream the inside of the rotor with reference to the shaft.

All these inconveniencies are avoided by the process according to the present invention, which makes it possible to cast the conducting material, which is preferably aluminium, without creating elastic tensions, and therefore to obtain an assembly of ferromagnetic rotor, cavities, rings and shaft which does not require a further reaming.

FIG. 14, illustrates a casting mould for carrying out the method according to the present invention.

It comprises a core 131 of a hard material which has a bore 132 and an outer surface 133 perfectly centered with respect to bore 132. In bore 132 the shaft 134 with its head 135, here shown as flat for the purpose of simplicity, is housed with a minimal play. On the outside are housed the sheets or at any rate the ferromagnetic part of the rotor, exemplified at 136. The two parts, shaft and sheets, are thus perfectly coaxial and concentric, and will remain such, provided that no deforming or elastic moment or force intervene to change their state. In order to introduce no deforming force and no moment, the shaft with its head is kept in position by a point 137 defined in the half-mould 138. The shaft is kept in contact with the point through head 135, by an elastic reaction produced by an elastic body 139 which bears for instance on the end of shaft 134 or on the circular zone 140, or such contact is provided by other suitable means. The projection of the point 137 from the wall 141 must correspond to the maximum deviation from a plane perpendicular to the shaft which the discoid 135 may have. The distance which the mould leaves between the plane 141 of the half-mould 138 and the face 142 of the core 131, should be twice such projection plus the thickness of the discoid 135. In this way the discoid 135 will never be elastically or permanently deformed and the assembly, when removed from the casting mould, will be practically coaxial and concentric. It is obvious that a groove existing on the shaft and here not illustrated, may be used, in cooperation with a reference on the mould, to position the shaft and head halfway between the plane 141 and the face 142, instead of the system described hereinbefore and which is preferred and constituted by the combination of a point and an elastic body. Further, in place of one point, a group of projections or references may be used, which together do not occupy so wide an area as to prevent the free positioning of the discoid 135 even when it is deviated and to create therein elastic deformations, or other suitable means may be used for positioning the shaft and head without exceeding the scope of the invention.

Another preferred embodiment for keeping the shaft with its discoidal head in position, is that shown in FIG. 15.

The shaft with its head is axially positioned not by axially reacting on two points of the shaft as in the case of FIG. 14, but by reacting on two points 147 and 147', facing one another, of the disc 145, and leaving the shaft 144 sufficiently free to slide axially in such a way as not to create a hyperstatic stress causing elastic deformation of the head or of the shaft itself.

It is understood that in casting a rotor comprising a shaft-discoid assembly, such as for instance illustrated in FIG. 14 or in FIG. 15, and in general in carrying into practice all the embodiments previously illustrated, the head of the shaft, be it constituted by a continuous discoid or by an apertured discoid or by a complex of spokes and rings, etc., is ideally and completely covered by the casting material and consequently is incorporated in the casting. The surface casting layers external to the shaft head, may naturally be removed more or less completely, but always without endangering the connection of the head itself with the casting, such connection being generally sufficiently assured by the rigid engagement of the peripheral parts of the shaft head in the casting. To remove such layers may become convenient or operatively necessary when it is desired to exploit the openings in the shaft head for the passage of cooling air. Since the thicknesses of the layer of casting material which covers the shaft head are extremely small, it may occur and it will often occur that, also in view of the presence of colder parts of the mould, the casting material will not succed in completely filling all the spaces about the shaft head, as on the contrary is indicated in FIG. 14. This will not have negative consequences because in any case the shaft head and therefore the shaft will remain secured to the casting without effort, without deformation, without internal stresses, and yet in a perfectly centered manner.

It is obvious that the process herein illustrated may be used even for rotors of in-out motors wherein the connections between the shaft and short-circuit rings, or between the shaft and shield, even through intermediate bodies, is effected in a way different from that considered in describing the rotors according to the present invention. The possible adaptations in carrying out the process according to the present invention will be within the skill of a person skilled in the art.

I claim:

1. A process for manufacturing a rotor for an in-out electric motor, said rotor being of the type including ferromagnetic elements, a shaft and a cup-like shield connecting said ferromagnetic elements to said shaft, said process comprising:

defining a mold including a mold cavity having a longitudinal axis and a bore extending coaxially of said longitudinal axis;

positioning within said mold cavity ferromagnetic elements of a rotor to be formed, such that said ferromagnetic elements extend coaxially of said longitudinal axis of said mold cavity;

providing an assembly of a shaft of the rotor to be formed and a discoidal head rigidly fixed to said shaft;

positioning said assembly within said mold cavity, such that said shaft extends into said bore with minimal play therebetween and extends coaxially of said ferromagnetic elements and of said longitudinal axis of said mold cavity, such that a remaining free space portion within said mold cavity defines the configuration of a to be cast metal component at least a part of which constitutes a portion of a shield of the rotor to be formed, and such that said discoidal head will at least partly be incorporated within said metal component;

maintaining said assembly in a desired axial alignment within said mold cavity, such that said shaft remains coaxial with said ferromagnetic elements and with said longitudinal axis of said mold cavity, by virtue of said shaft within said bore and by exerting on said assembly oppositely directed linear forces extending in a single straight line only, said single straight line extending parallel to said longitudinal axis of said mold cavity; and casting metal within said remaining free space portion within said mold cavity, while maintaining said desired axial alignment of said assembly, thereby forming said metal component at least partially enclosing said discoidal head, and joining said shaft to said ferromagnetic elements while maintaining said shaft and said ferromagnetic elements coaxial with each other.

2. A process as claimed in claim 1, wherein said step of exerting comprises applying said single line only of oppositely directed linear forces along said longitudinal axis of said mold cavity.

3. A process as claimed in claim 1, wherein said step of exerting comprises applying said single line only of oppositely directed linear forces along a line radially offset from said longitudinal axis of said mold cavity.

4. A process as claimed in claim 1, wherein said single line of oppositely directed linear forces are at least in part elastic forces.

5. A process as claimed in claim 1, wherein said step of providing includes forming said assembly with said shaft and the symmetrical axis of said discoidal head extending at an angle with respect to each other.

6. A process as claimed in claim 5, wherein said step of exerting comprises avoiding changing said angle between said shaft and said symmetrical axis of said discoidal head.

7. A process as claimed in claim 1, wherein said step of providing comprises rigidly attaching said discoidal head directly to an end of said shaft.

* * * * *